United States Patent [19]

Ueda

[11] Patent Number: 5,096,346

[45] Date of Patent: Mar. 17, 1992

[54] SIDE FACE MACHINING APPARATUS

[75] Inventor: Hiroshi Ueda, Ikoma, Japan

[73] Assignee: Ueda Engineering Kabushiki Kaisha, Nara, Japan

[21] Appl. No.: 311,851

[22] Filed: Feb. 17, 1989

[30] Foreign Application Priority Data

Dec. 7, 1988 [JP]  Japan ................ 63-310783

[51] Int. Cl.$^5$ ............................................. B23C 1/04
[52] U.S. Cl. ...................... 409/203; 409/197; 409/218; 409/225
[58] Field of Search ............... 409/145, 213, 217, 218, 409/219, 203-205, 224, 225, 183, 197, 198, 174, 220, 235, 190, 191, 192, 221, 138; 408/31, 42; 51/125, 111 R

[56]  References Cited

U.S. PATENT DOCUMENTS

| 1,685,572 | 9/1928 | Onsrud | 269/25 X |
| 2,325,541 | 7/1943 | Poole | 409/203 X |
| 2,421,716 | 6/1947 | Piose | 269/8 |
| 2,631,500 | 3/1953 | Wigton et al. | 409/203 X |
| 4,180,359 | 12/1979 | Schmid | 409/197 |
| 4,215,958 | 8/1980 | Jägers | 408/42 X |
| 4,712,953 | 12/1987 | Witzel et al. | 408/1 A |

FOREIGN PATENT DOCUMENTS 150907  11/1980  Japan ................ 409/192

Primary Examiner—Larry I. Schwartz
Assistant Examiner—Robert Schultz

[57]  ABSTRACT

A side face machining apparatus includes a pair of slide blocks opposed to each other and provided with work supports on respective opposed ends. At least one of the slide blocks is reciprocatingly movable toward and away from the other slide block. A pair of mount tables are mounted on the respective slide blocks movably in a direction intersecting the direction of reciprocating movement of the slide blocks. Each of the mount tables is provided with a machining tool. Each work support includes a contact portion having a reference face for positioning workpiece in place by contact with a side face of the work piece. At least one of the work supports has at one side thereof a guide for positioning the workpiece as placed on the supports by contact with another side face thereof.

4 Claims, 5 Drawing Sheets

SIDE FACE MACHINING APPARATUS

FIELD OF THE INVENTION

The present invention relates to apparatus for machining mainly opposite side faces of plates, for example, for jigs, platelike members, dies or the like.

BACKGROUND OF THE INVENTION

For example, duplex horizontal head milling machines of the fixed-bed type are conventionally used for cutting opposite side faces of plates or the like.

With reference to FIG. 5 showing such a conventional machine, opposite side faces of workpiece 9a are cut simultaneously with milling cutters 16a, 16a mounted on milling heads 15a, 15a, respectively, by moving a saddle 29 upward or downward to an adjusted level, clamping the work 9a as placed on the saddle 29, further moving the milling heads 15a, 15a to adjust the distance therebetween in accordance with the size to which the work 9a is to be cut, and thereafter reciprocatingly moving the saddle 29.

However, to cut the workpiece 9a to the desired size, the workpiece 9a must be accurately placed on the saddle 29.

Accordingly, the workpiece 9a is positioned in place usually by securing the workpiece to a platelike table 31 formed with specified pin bores 30 on the saddle 29, inserting several pins 32 into some of the bores 30 in the table 31 as seen in FIG. 5, then clamping the work 9a with a jig 33 with two intersecting side faces of the work 9a in contact with the pins 32 and thereafter removing the pins 32 from the table 31.

Nevertheless, the conventional side face cutting machine has the major problem of being large-sized and therefore limited in the place where it is installable since the saddle 29 itself is adapted to reciprocate.

Additionally, a very cumbersome procedure is needed for positioning the saddle 29 and the milling heads 15a, 15a and also for positioning the workpiece 9a, consequently entailing the drawback that the cutting operation requires much time and is very inefficient.

It is further necessary to prepare many tables 31 of different sizes for use with workpieces 9a of varying sizes, while it is also very cumbersome to change one table for another.

SUMMARY OF THE INVENTION

The main object of the present invention, which has been accomplished to overcome the problems heretofore encountered, is to provide a side face machining apparatus which has a reduced size and in which the workpiece to be machined can be positioned very easily and rapidly to achieve a high operation efficiency.

To fulfill the above object, the present invention is characterized in that the apparatus comprises a pair of slide blocks opposed to each other and provided with work supports at their respective opposed ends, at least one of the slide blocks is reciprocatingly movable toward and away from the other slide block, and a pair of mount tables are mounted on the respective slide blocks movably in a direction intersecting the direction of reciprocating movement of the slide blocks, each of the mount tables is provided with a machining tool.

With the side face machining apparatus having the above feature, the opposed slide blocks are moved toward or away from each other to adjust the distance therebetween in accordance with the size to which the contemplated workpiece is to be machined, whereby the work supports and the machining tools are moved at the same time with the slide blocks. This eliminates the need to move the work supports individually by additional means for adjustment, resulting in the outstanding advantage that the parts and the work are positionable in place very easily and rapidly without necessitating the cumbersome procedure conventionally needed.

Opposite side faces of the workpiece placed on the work supports thereacross can be machined by the tools at the same time by moving the mount tables in the direction intersecting the direction of reciprocation of the slide blocks.

Consequently, there is no need to provide reciprocatingly movable work support saddle which are conventionally used between the slide blocks. This leads to the advantage of rendering the apparatus itself small-sized and thereby minimizing the limitation imposed on the place of its installation, further resulting in diminished power consumption.

When each work support includes a contact portion having a reference face for positioning the work by contact with a side face thereof, the workpiece can be positioned in place with extreme ease without necessitating the conventional cumbersome procedure, merely by contacting one side face of the workpiece with the reference face of the contact portion.

At least one of the work supports may be provided with a positioning guide at one side thereof. This entails the advantage that the workpiece can be positioned in place more accurately and rapidly merely by placing the workpiece on the supports thereacross with another side face of the workpiece in contact with the guide.

When the work supports are provided with means for fixing the workpiece, the fixing means can also be brought to the specified position with the movement of the work supports. This results in an expedited operation to achieve a remarkably improved work efficiency.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the invention will be described below with reference to the drawings concerned.

Figure 1:
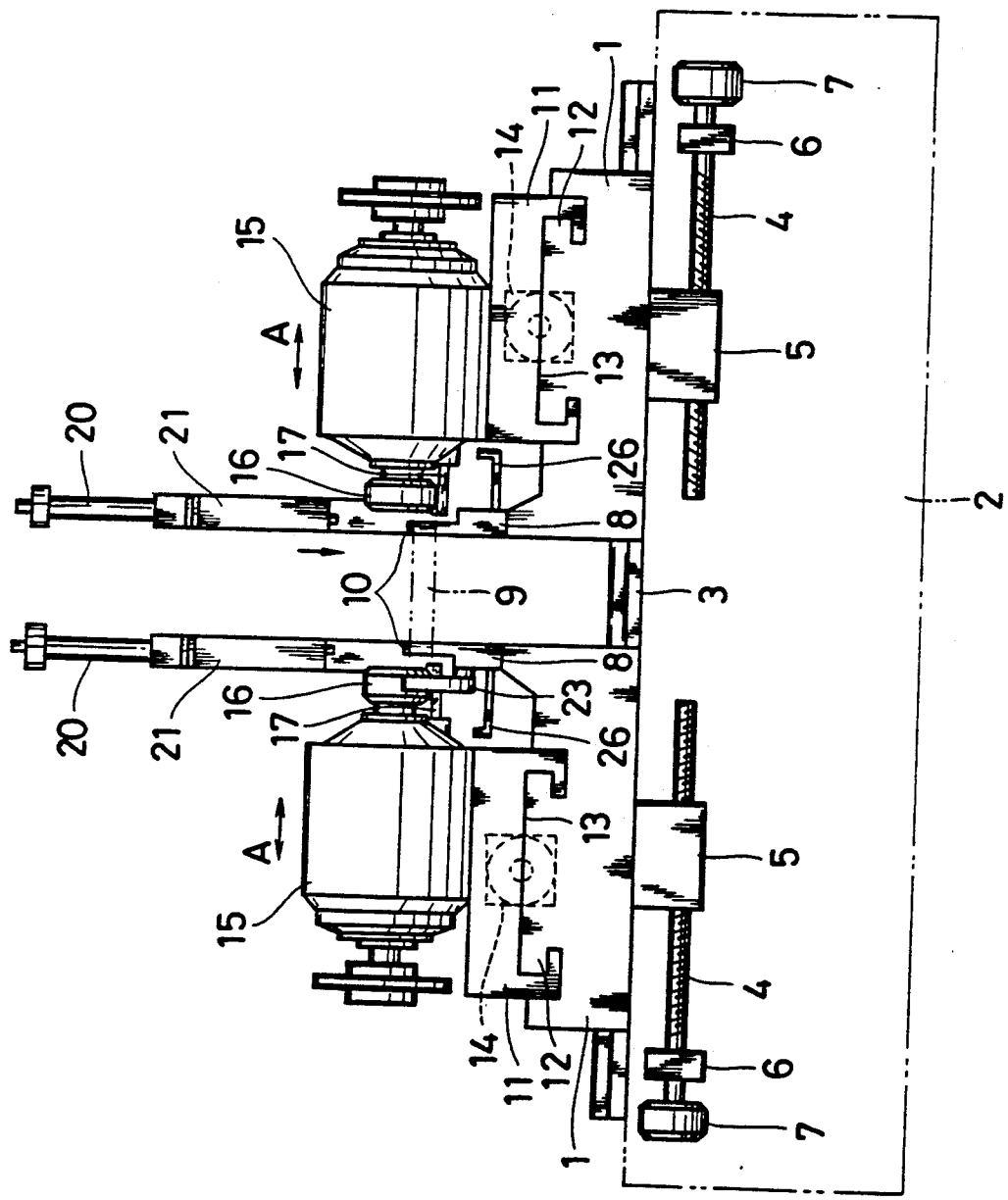
FIG. 1 is a front view of a side face machining apparatus embodying the present invention.
Figure 2:
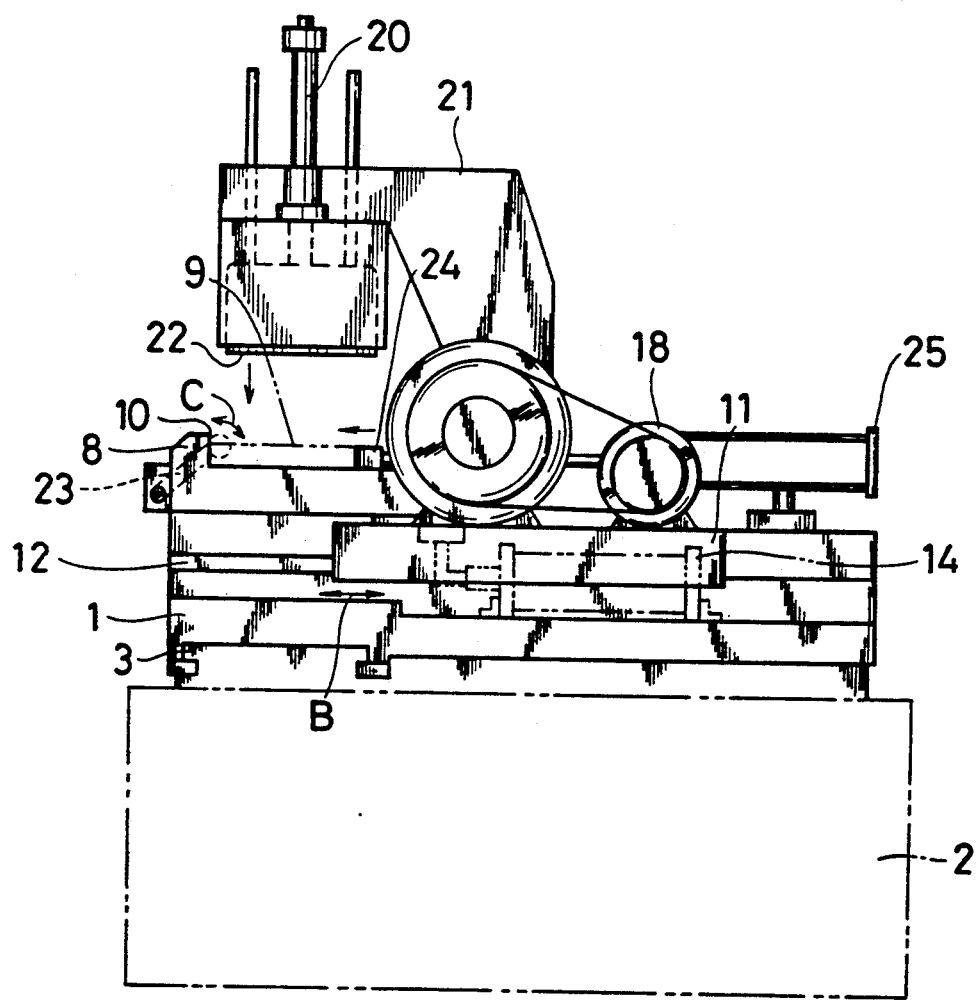
FIG. 2 is a side elevation of the apparatus.
Figure 3:
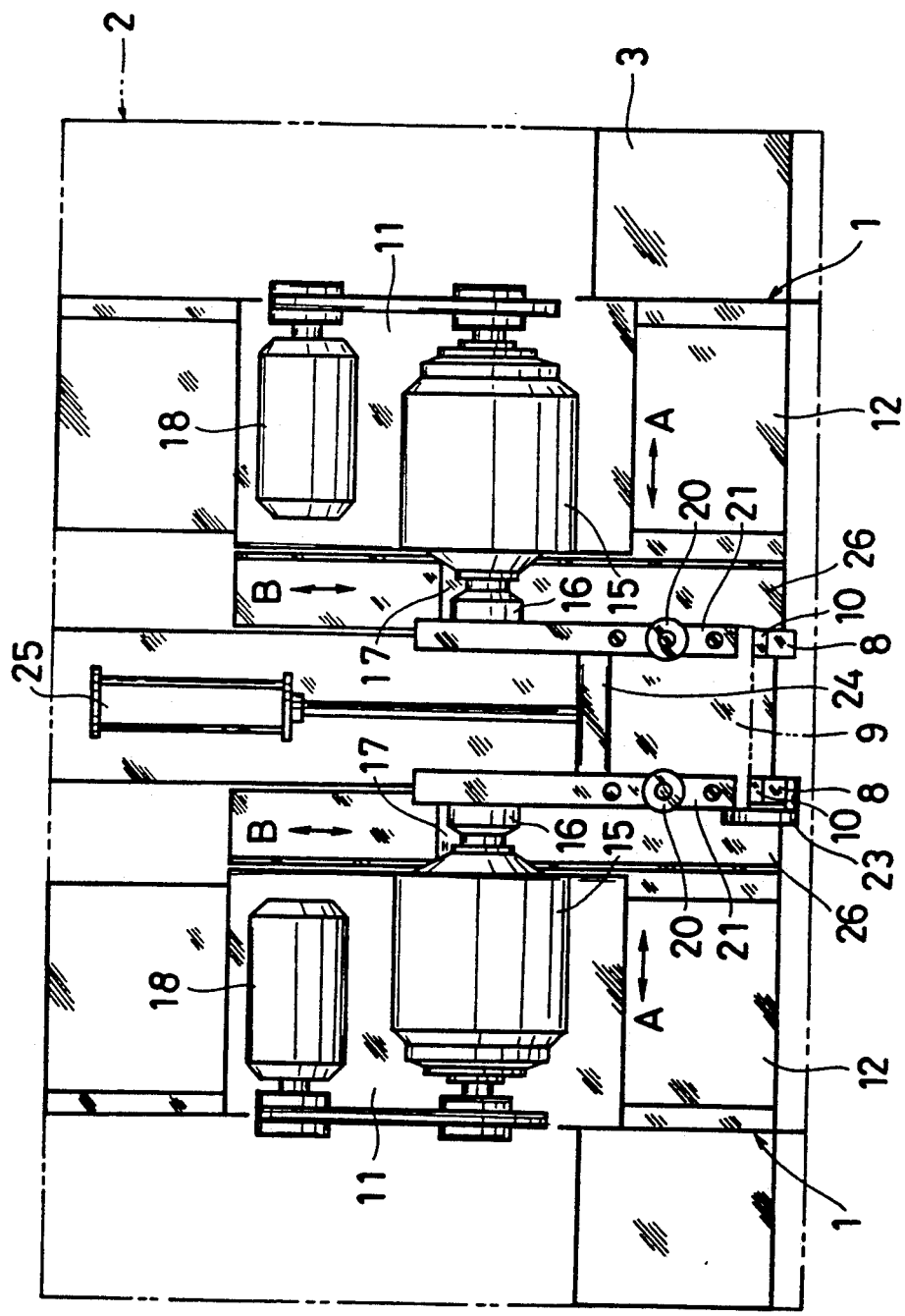
FIG. 3 is a plan view of the apparatus.

With reference to FIGS. 1 to 3 showing a side face machining apparatus, a pair of slide blocks 1, 1 are opposed to each other which are movable toward or away from each other along a rail 3 installed on the frame 2 of the apparatus. An elongated screw rod 4 is screwed through a female screw member 5 attached to the bottom of each slide block 1 and is coupled to an electric motor 7 at one end through a reduction gear 6. The slide blocks 1, 1 are movable toward or away from each other by driving the motors 7.

A pair of work supports 8, 8 provided at the respective opposed ends of the slide blocks 1, 1 each include at its one end a contact portion 10 formed at a right angle with the upper surface of the support to provide a reference face for the workpiece 9 to be machined when the front side face thereof is positioned in contact therewith. Mount tables 11, 11 are mounted on the slide blocks 1, 1, respectively, and each formed with a groove 13 having slidably fitted therein a guide rail 12 extending on the slide block 1 longitudinally thereof. The mount tables 11, 11 thus opposed to each other are movable on the slide blocks 1, 1 in the direction of arrows B in FIG. 3 by hydraulic cylinders 14, 14 which are operatively connected to each other.

Milling heads 15, 15 are provided on the respective mount tables 11, 11 and each having two spindles. Milling heads 16, 16 opposed to each other are each mounted on one of the two spindles. A chamfering cutter 17 disposed under each milling cutter 16 at one side thereof is mounted on the other spindle. The milling cutters 16, 16 and chamfering cutters 17, 17 are drivingly rotated by electric motors 18, 18, respectively. A hydraulic cylinder 20 is attached to a mount portion 21 provided on the other end of each work support 8 and is adapted to press the workpiece 9 against the support 8 from above to fix the workpiece thereto with a generally rectangular pressure plate 22 attached to the rod of the cylinder.

One of the work supports 8, 8 is provided at its one side with a positioning guide 23 which is pivotally movable in the direction of arrow C in FIG. 2. A fixing plate 24 is provided for pressing on the rear side face of the workpiece 9 placed on the work supports 8, 8 to fix the workpiece in position. The fixing plate 24 is slidable on the work supports 8, 8 by a hydraulic cylinder 25. A receptacle 26 for receiving chips or fragments produced by machining the workpiece 9 is provided alongside each work support 8.

The side face machining apparatus embodying the invention and having the foregoing construction is used in the following manner.

First, the electric motors 7, 7 are started to move the slide blocks 1, 1 in the direction of arrows A shown in FIG. 1 and thereby adjust the distance between the blocks 1, 1 in accordance with the amount of cut to be made in the work 9. The workpiece supports 8, 8 also move with the blocks at the same time.

The workpiece 9 is then placed on the work supports 8, 8 thereacross, with two intersecting side faces thereof in contact with the contact portions 10 of the supports 8, 8 and the positioning guide 23. The hydraulic cylinders 20, 20 and the hydraulic cylinder 25 serving as work fixing means are operated to fix the workpiece 9 to the supports 8, 8 by pressing the upper surface of the workpiece with the pressure plates 22, 22 and the rear side face thereof with the fixing plate 24. In the above arrangement, the hydraulic cylinders 20, 20 serving as the fixing means are attached to the mount portions 21, 21 on the work supports 8, 8 and are therefore moved with these supports 8, 8, with the result that the workpiece 9 can be fixed in place rapidly. Moreover, the workpiece 9 can be positioned accurately with extreme ease in the above-mentioned manner.

Next, the positioning guide 23 is pivotally moved in the direction C out of contact with the workpiece 9. The electric motors 18, 18 are then started to drive the milling cutters 16, 16 and the chamfering cutters 17, 17, and the mount tables 11, 11 are moved on the slide blocks 1, 1 in the direction B shown in FIG. 3 by the hydraulic cylinders 14, 14, whereby opposite side faces of the workpiece 9 fixed to the work supports 8, 8 are simultaneously cut and chamfered by the milling cutters 16, 16 and the chamfering cutters 17, 17. Thus, the mount tables 11, 11 are moved for machining instead of moving the workpiece supporting saddle conventionally used, so that the machining apparatus itself can be of a reduced size and can therefore be installed in a smaller space, hence effective utilization of space.

The workpiece 9 is thereafter released from the fixed state and removed from the work supports 8, 8. In this way, opposite side faces of the workpiece 9 can be completely cut by a greatly facilitated procedure.

Both slide blocks 1, 1 need not always be made movable toward or away from each other unlike the above embodiment; at least one of the slide blocks 1, 1 may be made movable toward or away from the other.

The means for moving the slide blocks 1, 1 and the work supports 8, 8 are not limited to those of the foregoing embodiment but can be any of other suitable means.

The positioning guide 23 need not always be provided but may be used when required.

Figure 4:
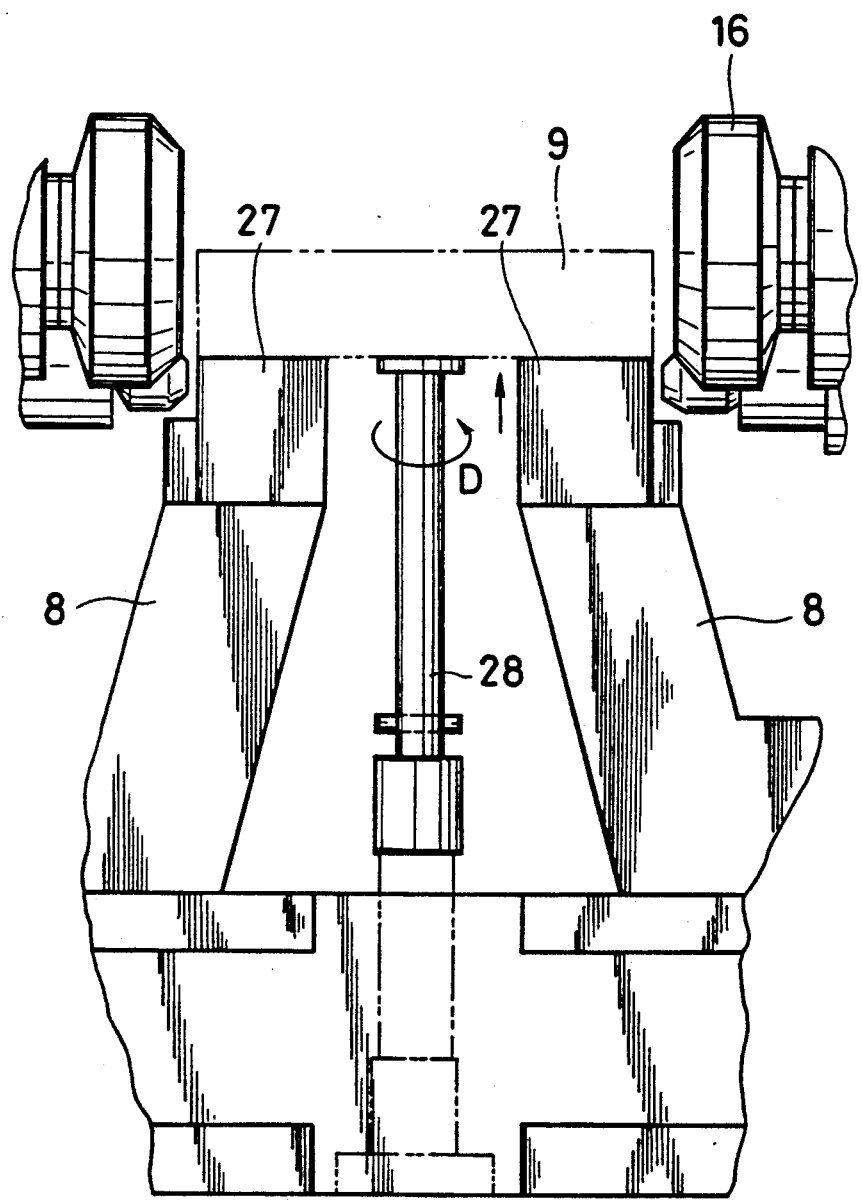
FIG. 4 is a fragmentary enlarged front view showing another side face machining apparatus embodying the invention.
Figure 5:
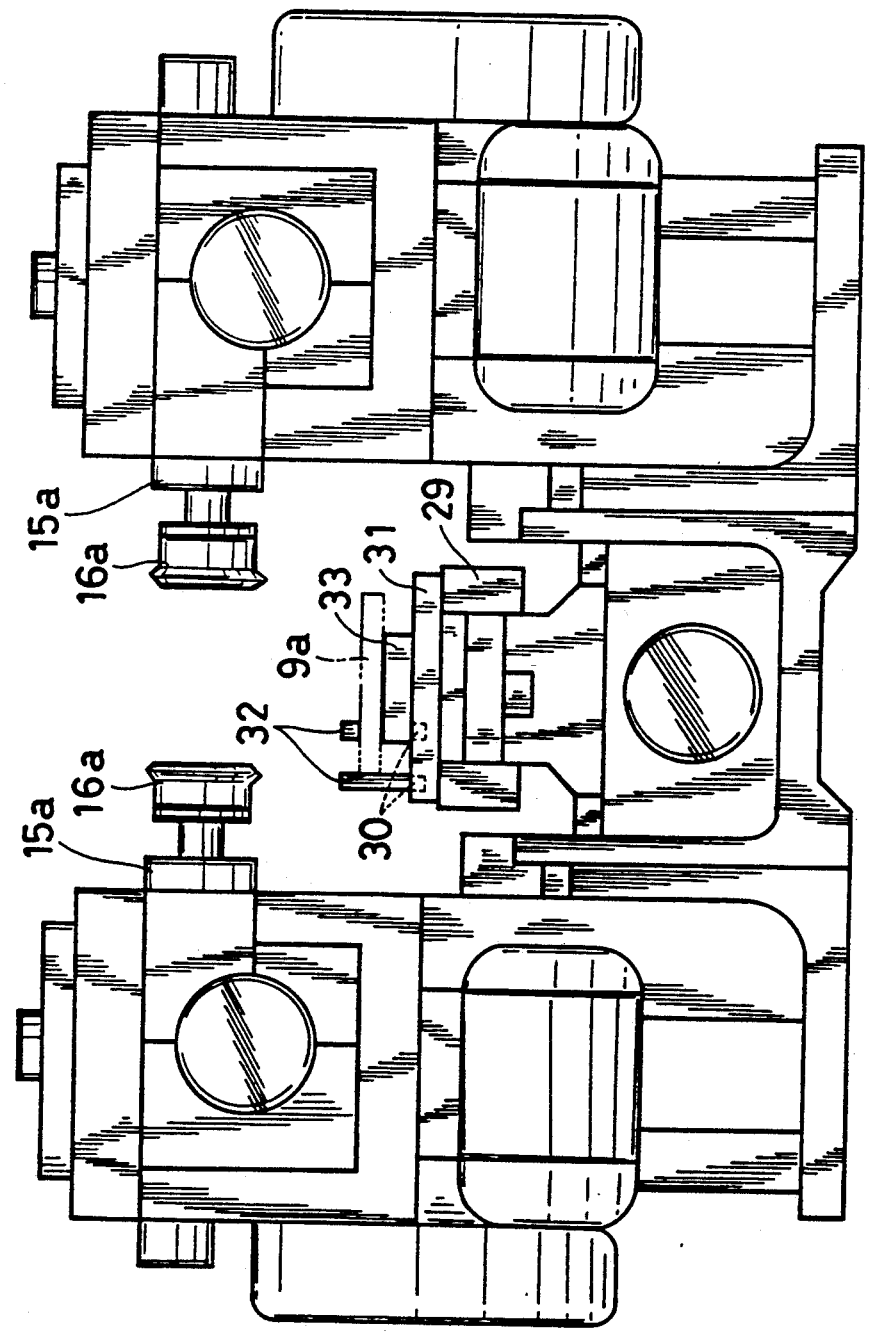
FIG. 5 is a front view schematically showing a conventional milling machine.

In place of the means of the foregoing embodiment for fixing the workpiece 9, for example magnets 27, 27 mounted on the respective work supports 8, 8 as shown in FIG. 4 may serve as the fixing means. It is then possible to rotate the workpiece through 90 degrees in the direction of arrow D by a shaft 28 which is made movable upward and downward and rotatable, for example, by an electric motor and hydraulic cylinder, so as to automatically machine the four side faces of the workpiece 9.

The above embodiment, which includes the chamfering cutters 17, 17, has the desirable advantage that the workpiece 9 can also be chamfered simultaneously with the cutting operation by the movement of the mount tables 11, 11, whereas the chamfering cutters 17, 17 can be eliminated.

The side face machining apparatus of the present invention is usable not only for cutting operation as described above but also, for example, for cutting off workpieces with use of different tools. Since the present apparatus requires no saddle for placing the workpiece thereon, a space is formed between the slide blocks 1, 1 which can be utilized to provide, for example, a belt conveyor for feeding workpieces to the apparatus and delivering the workpieces therefrom automatically.

Furthermore, the slide block 1, the work support 8 and the mount table 11 can be altered in shape or otherwise modified as desired within the contemplated scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A side face machining apparatus comprising:
   a pair of blocks opposed to each other and provided with work supports at respective adjacent opposed ends thereof;

means mounting at least one of the blocks for reciprocating movement toward and away from the other block for selectively moving said work supports relative to each other for supporting a workpiece therebetween;

at least one of the work supports being provided at one side thereof with pivotable guide means for positioning the workpiece on the work supports by contact with a side face to be machined of the workpiece;

fixing means for securing the positioning of the workpiece on said work supports;

said fixing means including a first plate movable relative to said work support for engaging the workpiece on a first surface and a second plate movable at right angles to said first plate and relative to said work support for engaging the workpiece on a second surface at right angles to said first surface, a pair of mount tables mounted on the respective blocks, means mounting said pair of mounting tables for movement relative to each other in a direction intersecting the direction of relative reciprocating movement of the blocks; and a machine tool being provided on each of the mount tables and being arranged and oriented to machine the workpiece positioned by said positioning guide means.

2. The side face machining apparatus according to claim 1, wherein each of the work supports is provided with a contact portion having a reference face for positioning a workpiece in place by contact with a side face of the workpiece.

3. The side face machining apparatus according to claim 1, wherein the machine tool provided on each mount table is a milling cutter.

4. The side face machining apparatus according to claim 1, wherein said first plate and said second plate are each operable by hydraulic cylinder for fixing the workpiece in position by pressure.

* * * * *